United States Patent [19]

Kubota et al.

[11] Patent Number: 4,681,905

[45] Date of Patent: Jul. 21, 1987

[54] STABILIZER COMPOSITIONS FOR SYNTHETIC RESINS IMPARTING IMPROVED LIGHT STABILITY

[75] Inventors: Naohiro Kubota, Ageo; Atsushi Nishimura, Saitama, both of Japan

[73] Assignee: Adeka Argus Chemical Co., Ltd., Tokyo, Japan

[21] Appl. No.: 795,372

[22] Filed: Nov. 6, 1985

[30] Foreign Application Priority Data

Nov. 7, 1984 [JP] Japan ................................ 59-234373

[51] Int. Cl.⁴ .............................................. C08K 5/34
[52] U.S. Cl. ...................................... 524/91; 524/100; 524/102; 548/259; 548/260; 252/401
[58] Field of Search ................... 252/401; 524/91, 100, 524/102; 548/259, 260

[56] References Cited

U.S. PATENT DOCUMENTS 3,936,305  2/1976  Hiraishi et al. ...................... 548/260
4,315,848  2/1982  Dexter et al. ......................... 524/91

FOREIGN PATENT DOCUMENTS 161538  12/1975  Japan ..................................... 524/91

*Primary Examiner*—John Kight
*Assistant Examiner*—Kriellion Morgan

[57] ABSTRACT

Stabilizer compositions for synthetic resins are provided, improving the resistance of the resin to deterioration when exposed to ultraviolet light, comprising a 2,2,6,6-tetramethylpiperidyl compound and an alkylidene-bis-(benzotriazolyl phenol) having the formula:

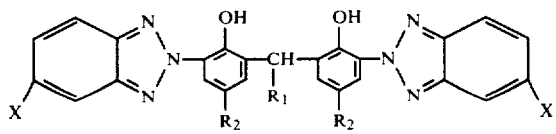

wherein:
- $R_1$ is hydrogen or alkyl having from one to about twelve carbon atoms;
- $R_2$ is alkyl having from one to about twelve carbon atoms or arylalkyl having from seven to about sixteen carbon atoms;
- X is selected from the group consisting of hydrogen, halogen, alkyl having from one to about twelve carbon atoms, aryl having from six to ten carbon atoms, arylalkyl having from seven to about sixteen carbon atoms, alkoxy having from one to about twelve carbon atoms, aryloxy having from six to ten carbon atoms; and arylalkoxy having from seven to about sixteen carbon atoms; as well as synthetic resin compositions containing such stabilizers.

36 Claims, No Drawings

STABILIZER COMPOSITIONS FOR SYNTHETIC RESINS IMPARTING IMPROVED LIGHT STABILITY

Synthetic resin compositions are subject to degradation upon exposure to ultraviolet light, resulting in cracking, discoloration and decreased reflectance. Such deterioration is unacceptable in products that must have long life and high weatherability.

Light stabilizers have been used to prevent such deterioration. However, most conventional stabilizers, such as ultraviolet light absorbers, are unsatisfactory in their stabilizing effect, and are lost by extraction by water. Some conventional stabilizers impart color to the resin composition.

2,2'-Methylene-bis-(4-hydrocarbyl-6-benzotriazolylphenols) are known light stabilizers for plastics, and a process for preparing them is disclosed in *Chemical Abstracts* 74 53666f (1971) and 77 62720h (1972).

U.S. Pat. No. 3,936,305, patented Feb. 3, 1976, to Hiraishi, Futaki, Horii and Yamashita, discloses that compounds represented by the following general formula are extremely effective as ultraviolet ray-absorbing agents, especially for color photographic photosensitive materials:

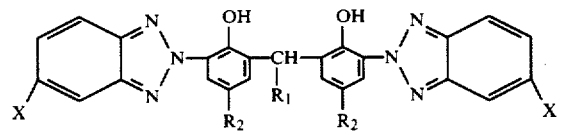

wherein $R_1$ is an alkyl group having 1 to 13, preferably 5 to 13 carbon atoms, $R_2$ is an alkyl group having 1 to 18 carbon atoms and X is hydrogen, a halogen, an alkyl, an alkoxy, an aryloxy, an aralkyloxy or an aryl group.

The patentees note that hydroxy benzotriazole is known as an excellent ultraviolet ray-absorbing agent, but gives solubility problems, crystallizing out in the amounts needed for adequate protection. The alkylidene-bis-benzotriazolylphenols are more soluble, and in addition cause no discoloration and are not colored themselves, when used in photosensitive gelatin or other hydrophilic protective colloid compositions.

Combinations of 2,2,6,6-tetramethyl piperidine compounds with benzotriazoles have been proposed. However, combinations of 2,2,6,6-tetramethyl piperidines with conventional benzotriazoles do not display satisfactory stabilizing effectiveness.

In accordance with this invention, stabilizer compositions for synthetic resin compositions are provided, improving the resistance of the resin to deterioration when exposed to ultraviolet light, comprising a 2,2,6,6-tetramethylpiperidine compound and an alkylidene-bis-(benzotriazolyl phenol) having the formula:

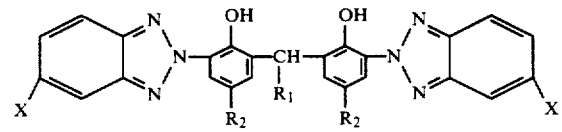

wherein:

$R_1$ is hydrogen or alkyl having from one to about twelve carbon atoms;

$R_2$ is alkyl having from one to about twelve carbon atoms or arylalkyl having from seven to about sixteen carbon atoms;

X is selected from the group consisting of hydrogen, halogen, alkyl having from one to about twelve carbon atoms, aryl having from six to ten carbon atoms, arylalkyl having from seven to about sixteen carbon atoms, alkoxy having from one to about twelve carbon atoms, aryloxy having from six to ten carbon atoms; and arylalkoxy having from seven to about sixteen carbon atoms, as well as synthetic resin compositions containing such stabilizers.

Exemplary alkyl represented by $R_1$ and $R_2$ and X include methyl, ethyl, propyl, isopropyl, butyl, isobutyl, sec-butyl, t-butyl, amyl, t-amyl, hexyl, heptyl, octyl, 2-ethylhexyl, isooctyl, 1,1,3,3-tetramethylbutyl, nonyl, decyl, undecyl and dodecyl.

Exemplary arylalkyl represented by $R_2$ and X include benzyl, α-methylbenzyl, α-ethylbenzyl, p-ethylbenzyl, cumyl, phenethyl, phenpropyl, phenbutyl, phenoctyl, phendodecyl, and phenhexyl.

Halogen represented by X include chlorine, bromine, iodine and fluorine.

The 2,2,6,6-tetramethylpiperidine compounds of this invention are known compounds that have in the molecule the group:

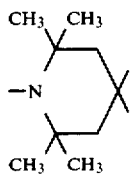

The 2,2,6,6-tetramethylpiperidine compounds are disclosed in the following illustrative patents:

Japanese Pat. Nos. 46-31733, 46-31734, 46-31735, 47-1628, 47-7380, 47-8539 and 48-12410; Japan kokai Nos. 46-5082, 47-590, 48-95986, 49-53570, 49-58085, 49-60337, 49-61236, 49-61238, 49-63738, 49-64634, 49-72332, 49-120492, 50-5435, 50-26779, 52-78876, 52-89677, 52-91875, 52-125175, 52-139071, 53-67749, 53-71082, 54-71185, 54-b 103877, 56-30985, 56-75488, 56-138189, 56-161387, 57-24393, 57-58681, 57-63359, 57-80453, 57-121034, 57-137358, 57-146755, 57-167316, 57-177022, 58-5319, 58-10568, 58-32642, 58-32864, 58-37025, 58-38720, 58-4703058-53931, 58-57444, 58-57445, 58-69879, 58-77862, 58-92660, 58-108238, 58-120646, 58-152053, 58-152881, 58-154739, 58-159460, 58-168634, 58-194862, 58-194931, 58-201777, 58-206594, 58-210094, 58-217554;

U.S. Pat. Nos. 3,542,729, 3,640,928, 3,684,765, 3,705,126, 3,893,972, 3,925,376, 3,929,804, 3,940,401, 3,992,390, 3,899,464, 3,984,371, 3,971,795, 3,959,291, 3,993,655, 4,007,158, 4,038,280, 4,061,616, 4,086,204, 4,089,841, 4,096,114, 4,101,508, 4,102,858, 4,104,248, 4,104,251, 4,105,625, 4,107,139, 4,108,829, 4,110,334, 4,115,476, 4,116,927, 4,118,369, 4,128,608, 4,136,081, 4,140,673, 4,144,224, 4,148,784, 4,151,356, 4,154,722, 4,161,592, 4,162,246, 4,166,813, 4,173,599, 4,177,186, 4,185,007, 4,197,236, 4,198,334, 4,210,612, 4,219,465, 4,223,147, 4,234,728, 4,237,297, 4,238,388, 4,238,613, 4,276,401, 4,279,804, 4,288,593, 4,289,686, 4,293,466, 4,293,467, 4,293,468, 4,308,362, 4,309,546, 4,311,820, 4,312,804, 4,315,859, 4,316,025, 4,316,837, 4,317,911, 4,321,374, 4,322,531, 4,326,063, 4,331,586, 4,335,242, 4,336,183, 4,340,534, 4,348,524, 4,351,915, 4,356,279, 4,356,287, 4,356,307, 4,369,274, 4,369,321, 4,376,836, 4,378,443, 4,395,508, 4,400,513, 4,404,301, 4,405,735, 4,408,051, 4,412,021, 4,413,075, 4,413,076, 4,413,093 and 4,413,096.

Particularly preferred classes of 2,2,6,6-tetramethyl piperidyl compounds have the formulae III, IV and V:

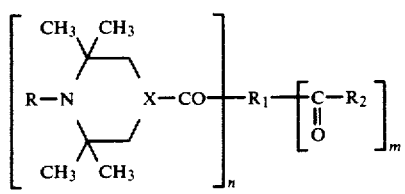
III

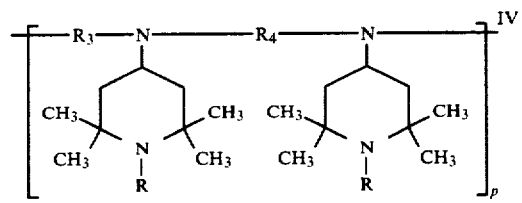
IV

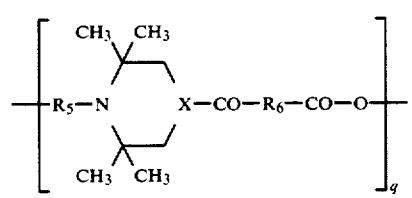
V wherein;

R is selected from the group consisting of hydrogen; oxyl; alkyl having from one to about eighteen carbon atoms; and acyl having from one to about eighteen carbon atoms;

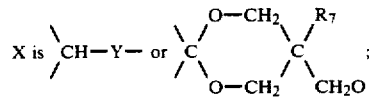

Y is —O— or —N($R_8$)—;

$R_7$ is alkyl having from one to about five carbon atoms;

$R_8$ is hydrogen or alkyl having from one to about eighteen carbon atoms;

$R_1$ is a residue of mono- or poly-carboxylic acid;

n is a number from 1 to about 6;

m is a number from 0 to about 5; and n+m is from 1 to about 6;

$R_2$ is —O—$R_8$ or —N($R_8$)$R_9$;

$R_9$ is alkyl having from one to about eighteen carbon atoms; and $R_8$ and $R_9$ may be taken together to form alkylene or oxadialkylene;

$R_3$ is alkylene or

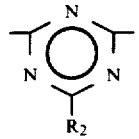

$R_4$ is alkylene;

$R_5$ is alkylene;

$R_6$ is alkylene or arylene;

p is a number from one to about twenty; and q is a number from about 2 to about 20; p and q represent the number of units in the polymer molecule of IV and V.

Exemplary and preferred alkylidene-bis-(benzotriazolylphenol) compounds of this invention are shown below:

1. 2,2'-Methylenebis(4-methyl-6-benzotriazolylphenol)
2. 2,2'-Methylenebis(4-(1,1,3,3-tetramethylbutyl)-6-benzotriazolylphenol))
3. 2,2'-Methylenebis(4-cumyl-6-benzotriazolylphenol)
4. 2,2'-Octylidenebis(4-methyl-(5'-methylbenzotriazolyl)phenol)
5. 2,2'-Octylidenebis(4-methyl-(5'-chlorobenzotriazolyl)phenol).

The alkylidene-bis-benzotriazolylphenols can be prepared by:

(1) reacting a 4-hydrocarbyl-6-benzotriazolyl phenol having the formula I:

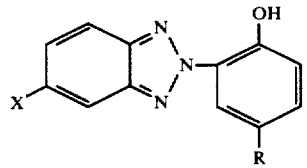
I with an amine $HNR_1R_2$ and formaldehyde in an organic solvent to produce a Mannich base having formula II:

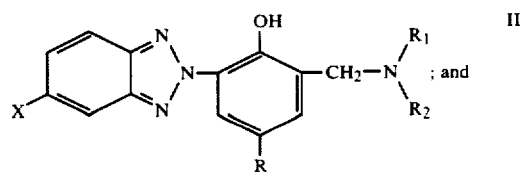
II (2) reacting the Mannich base with itself or a 4-hydrocarbyl-6-benzotriazolyl phenol having formula I, thereby forming a 2,2'-methylene-bis-(4-hydrocarbyl-6-benzotriazolyl-phenol).

The following Examples represent preferred embodiments of the process.

EXAMPLE 1

Preparation of 2,2'-methylene-bis-(4-methyl-6-benzotriazolyl-phenol)

4-Methyl-6-benzotriazolyl-phenol 225 g, diethylamine 110 g, and paraformaldehyde 51.8 g were dissolved in 250 ml of butanol, and heated with stirring at reflux temperature (95° C. to 105° C.) for 24 hours. The solvent was vacuum distilled off, and 308 g of 2-diethylaminomethyl-4-methyl-6-benzotriazolyl-phenol Mannich base was obtained as residue. (Yield=99%)

This Mannich base, 7.8 g, was dissolved in 20 ml of xylene, and sodium methylate (28% methanol solution) 0.15 g was added. The solution was heated with stirring under reflux at 140° C. to 150° C. for 10 hours while a nitrogen stream was passed through the reaction mixture. The solvent was vacuum distilled off, and 6.1 g of crude product was obtained as residue. (Purity=91%; Yield=96%)

The crude product was recrystallized from xylene, and a pale yellow powder, 2,2'-methylene-bis-(4-methyl-6-benzotriazolyl-phenol melting at 285° C. was obtained.

EXAMPLE 2

Preparation of 2,2'-methylene-bis-(4-methyl-6-benzotriazolyl-phenol)

6.2 g of the Mannich base obtained in Example 1 and 4-methyl-6-benzotriazolyl-phenol 4.5 g were dissolved in 200 ml of xylene, and sodium methylate (28% methanol solution) 0.2 g was added. The solution was heated with stirring under reflux at 140°–150° C. for 10 hours with a stream of nitrogen. After distilling of the solvent, and recrystallizing the residue from xylene, the desired product 2,2'-methylene-bis-(4-methyl-6-benzotriazolyl-phenol) was obtained in 95% yield.

EXAMPLE 3

Preparation of 2,2'-methylene-bis-(4-(1,1,3,3-tetramethyl)butyl-6-benzotriazolyl-phenol)

2-Diethylaminomethyl-4-(1,1,3,3-tetramethyl)butyl-6-benzotriazolyl-phenol Mannich base was prepared using 4-(1,1,3,3-tetramethyl)butyl-6-benzotriazolyl-phenol by the same procedure as in Example 1. This Mannich base 37 g and 4-(1,1,3,3-tetramethyl)butyl-6-benzotriazolyl-phenol 25 g were dissolved in 60 ml of xylene, and sodium methylate (28% methanol solution) 3.1 g was added. The solution was heated with stirring under reflux at 140°–150° C. for 10 hours with a stream of nitrogen. After distilling of the solvent, and recrystallizing the residue from xylene, 55.2 g of the crude product was obtained. (Purity=93%; Yield=93%)

The crude product was recrystallized from n-heptane, and a white powder, 2,2'-methylene-bis-4-(1,1,3,3-tetramethyl)butyl-6-benzotriazolyl-phenol, melting at 200° C. was obtained.

EXAMPLE 4

Preparation of 2,2'-methylene-bis-(4-cumyl-6-benzotriazolyl-phenol)

2-Diethylaminomethyl-4-cumyl-6-benzotriazolyl-phenol Mannich base was prepared using 4-cumyl-6-benzotriazolyl-phenol by the same procedure as in Example 1. This Mannich base 10.0 g and 4-cumyl-6-benzotriazolyl-phenol 6.6 g were dissolved in 60 ml of xylene, and sodium methylate (28% methanol solution) 3.1 g was added. A white crystalline product, 2,2'-methylene-bis-(4-cumyl-6-benzotriazolyl-phenol) melting at 190° C. was obtained. (Yield=93%).

EXAMPLE 5

Preparation of 2,2'-methylene-bis-(4-methyl-6-benzotriazolyl-phenol)

31.0 g of the Mannich base obtained in Example 1 and methyl iodide 30 g were dissolved in 100 g of ethanol, and heated with stirring at reflux temperature (60° C. to 75° C.) for 24 hours. The solvent was distilled off, and the pale yellow crystalline product (methyl-diethyl-2-hydroxy-3-benzotriazolyl-5-methylbenzylammonium iodide) was obtained by recrystallization from ethanol.

This product 9.0 g and sodium methylate (28% methanol solution) 4.0 g were dissolved in 40 g of butoxyethoxyethanol, and heated with stirring at reflux temperature (160° C. to 170° C.) for 10 hours while a nitrogen stream was passed through the reaction mixture. The solvent was vacuum distilled off, and 6.1 g of crude product was obtained as residue. (Purity=91%; Yield=96%)

The crude product was recrystallized from xylene and the desired product, 2,2'-methylene-bis-(4-methyl-6-benzotriazolyl-phenol) was obtained in 95% yield.

Exemplary 2,2,6,6-tetramethyl piperidine compounds are shown below:

1. 4-Benzoyloxy-2,2,6,6-tetramethylpiperidine
2. 1-(3,5-Di-t-butyl-4-hydroxyphenylpropionyloxyethyl)-4-(3,5-di-t-butyl-4-hydroxyphenylpropionyloxy)-2,2,6,6-tetramethylpiperidine
3. 4-(β-3',5'-Di-t-butyl-4-hydroxyphenylpropionyloxy)-2,2,6,6-tetramethylpiperidine
4. Bis(2,2,6,6-tetramethyl-4-piperidyl)sebacate
5. Bis(1,2,2,6,6-pentamethyl-4-piperidyl)sebacate
6. Bis(1,2,2,6,6-pentamethyl-4-piperidyl)-2-butyl-2-(3,5-di-t-butyl-4-hydroxybenzyl)malonate
7. Bis(1-acryloyl-2,2,6,6-pentamethyl-4-piperidyl)-2-butyl-2-(3,5-di-t-butyl-4-hydroxybenzyl)malonate
8. Bis(9-aza-8,8,10,10-tetramethyl-3-ethyl-1,5-dioxaspiro[5.5]-3-undecylmethyl)methyliminodiacetate
9. Bis(2,2,6,6-tetramethyl-4-piperidyl-1-oxyl)sebacate
10. Tris(2,2,6,6-tetramethyl-4-piperidyl)citrate
11. Tris(2,2,6,6-tetramethyl-4-piperidyl)nitrilotriacetate
12. Tris(2,2,6,6-tetramethyl-4-piperidyl)butanetricarboxylate
13. Tris(2,2,6,6-tetramethyl-4-piperidyl)trimellitate
14. Tetra(2,2,6,6-tetramethyl-4-piperidyl)pyromellitate
15. Tetra(2,2,6,6-tetramethyl-4-piperidyl)-1,3-bis-(aminomethyl)cyclohexanetetraacetate
16. Tetra(2,2,6,6-tetramethyl-4-piperidyl)-1,2,3,4-butanetetracarboxylate
17. Tris(2,2,6,6-tetramethyl-4-piperidyl)-mono(isotridecyl)-1,2,3,4-butanetetracarboxylate
18. Tetra(1,2,2,6,6-pentamethyl-4-piperidyl)-1,2,3,4-butanetetracarboxylate
19. Tris(1,2,2,6,6-pentamethyl-4-piperidyl)-mono(isotridecyl)-1,2,3,4-butanetetracarboxylate
20. Bis(1,2,2,6,6-pentamethyl-4-piperidyl)-di(isotridecyl)-1,2,3,4-butanetetracarboxylate
21. Bis(2,2,6,6-tetramethyl-4-piperidyl)-di-(isotridecyl)-1,2,3,4-butanetetracarboxylate
22. Bis(2,2,6,6-tetramethyl-4-piperidyl-1-oxyl)-di(isotridecyl)-1,2,3,4-butanetetracarcoxylate
23. Mono(1,2,2,6,6-pentamethyl-4-piperidyl)-monomethylsebacate
24. 3,9-Bis(1,1-dimethyl-2-(tris(2,2,6,6-tetramethyl-4-piperidyloxycarbonyl)butylcarbonyloxy)ethyl)-2,4,8,10-tetraoxaspiro[5.5] undecane
25. 3,9-Bis(1,1-dimethyl-2-(tris(1,2,2,6,6-pentamethyl-4-piperidyl-oxycarbonyl)butylcarbonyloxy)ethyl)-2,4,8,10-tetraoxaspiro[5.5]undecane
26. 2,4,6-Tris(2,2,6,6-tetramethyl-4-piperidyloxy)-s-triazine
27. 2-Dibutylamino-4,6-bis(9-aza-8,8,10,10-tetramethyl-3-ethyl-1,5-dioxaspiro[5.5]-3-undecylmethoxy)-s-triazine 28. N,N'-Bis(4,6-bis(9-aza-8,8,10,10-tetramethyl-3-ethyl-1,5-dioxaspiro[5.5]-3-undecylmethoxy)-s-triazine-2-yl)piperazine
29. 1,5,8,12-Tetrak is(4,6-bis(N-(2,2,6,6-tetramethyl-4-piperidyl)butylamino)-1,3,5-triazine-2-yl)1,5,8,12-tetraazadodecane
30. Bis(9-aza-8,8,10,10-tetramethyl-3-ethyl-1,5dioxaspiro[5.5]-3-undecylmethyl)carbonate
31. Bis(9-aza-8,8,10,10-tetramethyl-3-ethyl-1,5-dioxaspiro[5.5]-3-undecylmethyl)-hydrogenatedbisphenol-A-dicarbonate
32. Bis(2,2,6,6-tetramethyl-4-piperidyl)-pentaerythritoldiphosphite
33. Bis(9-aza-8,8,10,10-tetramethyl-3-ethyl-1,5-dioxaspiro[5.5]-3-undecylmethyl)-pentaerythritoldiphosphite
34. Tetra(2,2,6,6-tetramethyl-4-piperidyl)-bisphenol-A-diphosphite
35. 3,5-Di-t-butyl-4-hydroxybenzyl-bis(2,2,6,6-tetramethyl-4-piperidyl)phosphonate
36. Condensate of 1-(2-hydroxyethyl)-2,2,6,6-tetramethyl-4-piperidinol with dimethylsuccinate
37. Condensate of 2-t-octylamino-4,6-dichloro-s-triazine with N,N'-bis-(2,2,6,6-tetramethyl-4-piperidyl)-hexamethylenediamine
38. Condensate of N,N'-bis(2,2,6,6-tetramethyl-4piperidyl) with hexamethylenediamine/dibromoethane
39. Bis(9-aza-8,8,10,10-tetramethyl-3-ethyl-1,5-dioxaspiro[5.5]-3-undecylmethyl)ether
40. 3-Glycidyl-8-methyl-7,7,9,9-triazaspiro[4.5]decane-2,4-dione
41. 3-Dodecyl-8-acetyl-7,7,9,9-tetramethyl-1,3,8-triazaspiro[4.5]decane-2,4-dione
42. 3-Octyl-7,7,9,9-tetramethyl-1,3,8-triazaspiro[4.5]-decane-2,4-dione
43. 2,2,4,4-Tetramethyl-7-oxa-3,20-diazadispiro[5.1.11.2]heneicosane-21-one The light stabilizer compositions of this invention preferably contain an amount of each component (2,2,6,6-tetramethyl piperidyl compound and alkylidene-bis-(benzotriazolylphenol)) within the range from about 0.001 to about 5, preferably from about 0.01 to about 3, parts by weight per 100 parts by weight of polymer material, sufficient to improve the resistance of the polymer material to deterioration upon exposure to ultraviolet light.

The light stabilizer systems of the invention can be conbined with conventional heat stabilizers such as phenolic antioxidant heat stabilizers, thereby constituting light and heat stabilizer compositions of the invention.

The phenolic antioxidant contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point, and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

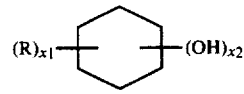

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl.

$x_1$ and $x_2$ are integers from one to four, and the sum of $x_1$ and $x_2$ does not exceed six.

The polycyclic phenol phenol is one having at least two aromatic nuclei linked by a polyvalent linking radical, as defined by the formula:

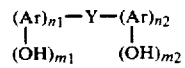

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms.

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar-Y-Ar-Y-Ar.

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy $$(R'C-O)$$
$$\parallel$$
$$O$$

where R' is aryl, alkyl or cycloalkyl, or thiohydrocarbon groups having from one to about thirty carbon atoms, and carboxyl $$(-C-O-) \text{ groups.}$$
$$\parallel$$
$$O$$

Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluoroenyl groups.

When Ar is a benzene nucleus, the polyhydric polycyclic phenol has the structure:

$$(OH)_{m1}, (R_1)_{x1} - Y - \left[ (OH)_{m2}, (R_2)_{x2} - Y - \right]_{y1} (OH)_{m3}, (R_3)_{x3} \Big]_{y2}$$

wherein
$R_1$, $R_2$ and $R_3$ are inert substituent groups as described in the previous paragraph;
$m_1$ and $m_3$ are integers from one to a maximum of five;
$m_2$ is an integer from one to a maximum of four;
$x_1$ and $x_3$ are integers from zero to four, and
$x_2$ is an integer from zero to three;
$y_1$ is an integer from zero to about six and
$y_2$ is an integer from one to five, preferably one or two.

Preferably, the hydroxyl groups are located ortho and/or para to Y.

Exemplary Y groups are alkylene, alkylidene, and alkenylene; arylene, alkyl arylene, arylalkylene; cycloalkylene, cycloalkylidene; and oxa- and thia-substituted such groups; tetrahydrofuranes, esters and triazino groups. The Y groups are usually bi, tri, or tetravalent, connecting two, three or four Ar groups. However, higher valency Y groups connecting more than four Ar groups, can also be used. According to their constitution, the Y groups can be assigned to subgenera as follows:

(1) Y groups where at least one carbon in a chain or cyclic arrangement connect the aromatic groups, such as:

$-CH_2-CH_2-$; $-(CH_2)_5-$; $-CH_2-$;

(2) Y groups where only atoms other than carbon link the aromatic rings, such as

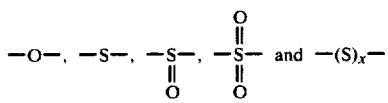

where x is a number from one to ten;

(3) Y groups made up to more than a single atom including both carbon and other atoms linking the aromatic nuclei, such as:

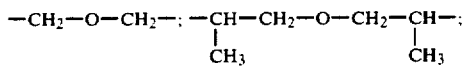

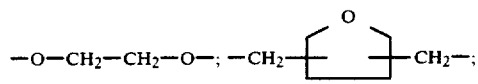

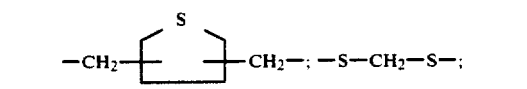

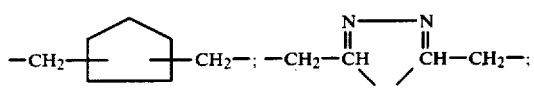

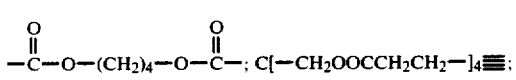

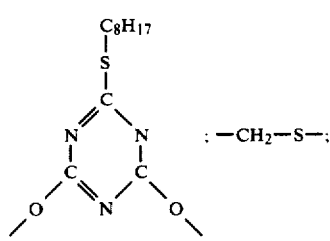

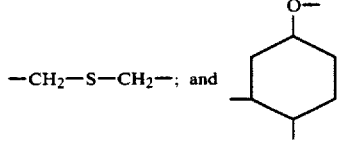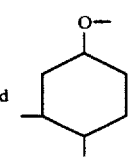

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl-phenol, o-, and m-tert-butyl-p-hydroxy-anisole, p-n-decyloxyphenol, p-n-decyloxy-cresol, nonyl-n-decyloxycresol, eugenol, isoeugenol, glyceryl monosalicylate, methyo-p-hydroxy-cinnamate, 4-benzyloxy-phenol, p-acetylaminophenol, p-stearyl-aminophenol, methyl-p-hydroxybenzoate, p-di-chlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl-3,5-di-t-butyl-4-butyl-4-hydroxybenzylphosphonate, and distearyl (4-hydroxy-3-methyl-5-t-butyl)benzylmalonate.

Exemplary polyhydric phenols are orcinol, propyl gallate, catechol, resorcinol, 4-octyl-resorcinol, 4-dodecylresorcinol, 4-octadecyl-catechol, 4-isooctylphloroglucinol, pyrogallol, hexahydroxybenzene, 4-isohexylcatechol, 2,6-di-tertiary-butyl-resorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)propane, methylene-bis-(p-cresol), 4,4'-benzylidene bis (2-tertiary-butyl-5-methyl-phenol), 4,4'-cyclo-hexylidene bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis-(p-cresol), 4,4'-oxobis-phenol, 4,4'-oxobis-(3-methyl-5-isopropyl-phenol), 4,4'-oxobis-(3-methyl-phenol), 2,2'-oxobis-(4-dodecyl-phenol), 2,2'-oxobis-(4methyl-5-tertiary-butyl-phenol), 4,4'-thio-bis-phenol; 4,4'-thio-bis-(3-methyl-6-tertiary-butyl-phenol), 2,2'-thio-bis-(4-methyl-6-tertiary-butyl-phenol), 4,4'-n-butylidene-(2-t-butyl-5-methylphenol), 2,2'-methylene-bis-(4-methyl-6-(1'-methyl-cyclohexyl)phenol), 4,4'-cyclohexylene bis-(2-tertiary-butyl-phenol), 2,6-bis-(2'-hydroxy-3'-t-butyl-5'-methyl-benzyl)-4-methyl-phenol, 4,4'-oxobis(naphthalene-1,5-diol), 1,3'-bis-(naphthalene-2,5-diol)propane, and 2,2'-butylene bis-(naphthalene-2,7-diol), (3-methyl-5-tert-butyl-4-hydroxyphenyl)-4'-hydroxy-phenyl)propane, 2,2'-methylene-bis-(4-methyl-5-isopropylphenol), 2,2'-methylene-bis-(4-methyl-5-isopropylphenol), 2,2'-methylene-bis-(5-tert-butyl-4-chlorophenol), (3,5-di-tert-butyl-4-hydroxyphenyl)-(4'-hydroxyphenyl)ethane, (2-hydroxy-phenyl)(3,5'-di-tert-butyl-4',4-hydroxyphenyl)ethane, 2,2'-methylene-bis-(4-octylphenol), 4,4'-propylene-bis-(2-tert-butylphenol), 2,2'-isobutylene-bis-(4-nonylphenol), 2,4-bis-(4-hydroxy-3-t-butyl-phenoxy)-6-(n-octylthio)-1,3,5-triazine, 2,4,6-tris-(4-hydroxy-3-t-butyl-phenoxy)-1,3,5-triazine, 2,2'-bis-(3-t-butyl-4-hydroxyphenyl)thiazolo-(5,4-d)thiazole, 2,2'-bis-(3-methyl-5-t-butyl-4-hydroxyphenyl)thiazolo-(5,4-d)-thiazole, 4,4'-bis-(4-hydroxyphenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol-bis-(3-tert-butyl-4-hydroxyphenoxy acetate), 1,4-butanedio-bis-(3-tert-butyl-4-hydroxyphenoxy acetate), pentaerythritol tetra-(4-hydroxyphenol propionate), 2,4,4'-tri-hydroxy benzophenone, bis-(2-tert-butyl-3-hydroxy-5-methylphenyl)sulfide, bis-(2-tert-butyl-4-hydroxy-5-methylphenyl)sulfide, bis-(2-tert-butyl-4-hydroxy-5-methylphenyl)sulfoxide, bis-(3-ethyl-5-tert-butyl-4-hydroxybenzyl)sulfide, bis-(2-hydroxy-4-methyl-6-tert-butyl-phenyl)sulfide, 4,4'-bis-(4-hydroxyphenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methyl-benzoyl-n-octane, 2,2'-ethylene-bis-[4'-(3-tert-butyl-4- hydroxyphenyl)-thiazole], 1-methyl-3-(3-methyl-5-tert-butyl-4-hydroxybenzyl)-naphthalene, 2,2'-(2-butene)-bis-(4-methoxy-6-tert-butylphenol)-bis-[3,3-bis-(4-hydroxy-3-t-butylphenyl)butyric acid]glycol ester, 4,4'-butylidene-bis-(6-t-butyl-m-cresol), 1,1,3-tris-(2-methyl-4-hydroxy-5-t-butylphenyl)butane, 1,3,5-tris-(3,5-di-t-butyl-4-hydroxybenzyl)-2,4,6-trimethylbenzene, tetrakis[methylene-3-(3,5-di-t-butyl-4-hydroxyphenyl)propionate]methane, 1,3,5-tris-(3,5-di-t-butyl-4-hydroxybenzyl)isocyanurate, 1,3,5-tris-(3,5-di-t-butyl-4-hydroxyphenyl)propionyl-oxyethyl isocyanurate, 2-octylthio-4,6-di-(4-hydroxy-3,5-di-t-butyl)phenoxy-1,3,5-triazine, 4,4'-thiobis-(6-t-butyl-m-cresol) and pentaerythritol hydroxyphenyl propionate.

A particularly desirable class of polyhydric polycyclic phenols are the dicyclopentadiene polyphenols, which are of the type:

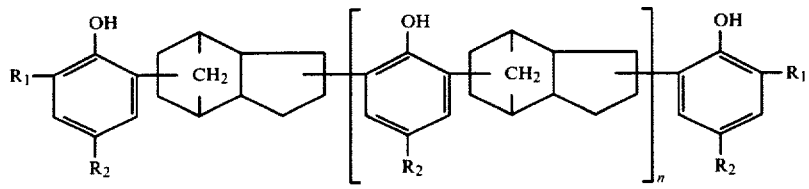

in which

R₁ and R₂ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

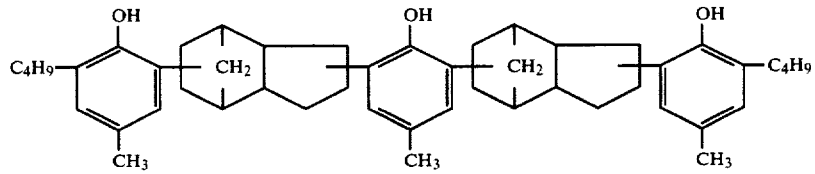

The polyhydric polycyclic phenols used in the invention can also be condensation products of phenols or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus 1. For method of preparation, see e.g., U.S. Pat. No. 3,124,555, U.S. Pat. No. 3,242,135, and British Pat. No. 961,504.

In addition, the stabilizer compositions of the invention can include other stabilizers conventionally used as heat and/or light stabilizers for synthetic resins, including polyvalent metal salts of organic acids, organic triphosphites and acid phosphites.

When the stabilizer composition is used in conjunction with a polyvalent metal salt of an organic acid, the organic acid will ordinarily have from about six to about twenty-four carbon atoms. The polyvalent metal can be any metal of Group II of the Periodic Table, such as zinc, calcium, cadmium, barium, magnesium and strontium. The alkali metal salts and heavy metal salts such as lead salts are unsatisfactory. The acid can be any organic non-nitrogeneous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkylsubstituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, non-octoic acid, isooctoic acid, capric acid, undecylic acid, lauric acid, myristic acid, palmitic acid, margaric acid, stearic acid, oleic acid, ricinoleic acid, behenic acid, chlorocaproic acid, hydroxy capric acid, benzoic acid, phenylacetic acid, butyl benzoic acid, ethyl benzoic acid, propyl benzoic acid, heyxl benzoic acid, salicylic acid, naphthoic acid, 1-naphthalene acetic acid, orthobenzoyl benzoic acid, naphthenic acids derived from petroleum, abietic acid, dihydroabietic acid, hexahydrobenzoic acid, and methyl furoic acid.

The water-insoluble salts are preferred, because they are not leached out when the plastic is in contact with water. Where these salts are not known, they are made by the usual types of reactions, such as by mixing the acid, or anhydride with the corresponding oxide or hydroxide of the metal in a liquid solvent, and heating, if necessary, until salt formation is complete.

A variety of organic triphosphites and acid phosphites can be employed, of which the following are exemplary.

The organic triphosphite can be any organic phosphite having three or more organic radicals attached to phosphorus through oxygen. The acid phosphite can be any organic phosphite having one or two organic radicals attached to phosphorus through oxygen. These radicals can be monovalent radicals, in the case of the triphosphites, diphosphites and monophisphites.

The organic triphosphites in which the radicals are monovalent radicals can be defined by the formula:

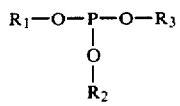

in which
R$_1$, R$_2$ and R$_3$ are selected from the group consisting of alkyl, alkenyl, aryl, alkaryl, aralkyl, and cycloalkyl groups having from one to about thirty carbon atoms.

The acid phosphites are defined by the same formula, but one or two of R$_1$, R$_2$ and R$_3$ is hydrogen or a cation of a metal or ammonium.

Also included are the organic triphosphites having a bivalent organic radical forming a heterocyclic ring with the phosphorus of the type:

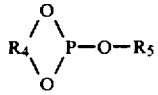

in which
R$_4$ is a bivalent organic radical selected from the group consisting of alkylene, arylene, aralkylene, alkarylene and cycloalkylene radicals having from two to about thirty carbon atoms, and R$_5$ is a monovalent organic radical as defined above in the case of R$_1$, R$_2$ and R$_3$;
R$_5$ is hydrogen or a cation, in the case of the acid phosphites.

Also useful organic triphosphites are mixed heterocyclic-open chain phosphites of the type:

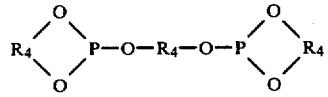

More complex triphosphites are formed from trivalent organic radicals, of the type:

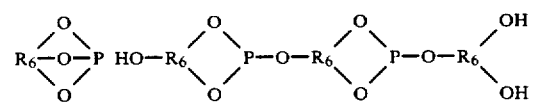

in which
R$_6$ is a trivalent organic radical of any of the types of R$_1$ to R$_5$, inclusive, as defined above.

A particularly useful class of complex triphosphites are the tetraoxadiphosphaspiro undecanes of the formula:

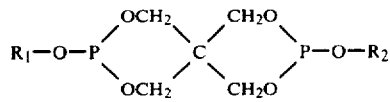

where
R$_1$ and R$_2$ are selected from the group consisting of aryl, alkyl, aryloxyethyl, alkyloxyethyl, aryloxyethoxyethyl, alkyloxyethoxyethyl and alkyloxypolyethoxyethyl having from about 1 to about 30 carbon atoms.

In the case of the acid phosphites, one or both of R$_1$ and R$_2$ is also hydrogen or a cation.

An especially preferred class of organic triphosphites and acid phosphites have a bicyclic aromatic group attached to phosphorus through oxygen, with no or one or more phenolic hydroxyl groups on either or both of the aromatic rings. These phosphites are characterized by the formula;

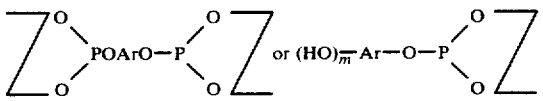

in which
Ar is a mono or bicyclic aromatic nucleus and m is an integer of from 0 to about 5. Z is one or a plurality of organic radicals as defined above for R$_1$ to R$_6$, taken singly or together in sufficient number to satisfy the valences of the two phosphite oxygen atoms.

One or both Z radicals is also hydrogen, in the case of the acid phosphites, and can include additional bicyclic aromatic groups of the type (HO)$_m$—Ar.

The cation in the case of acid phosphites can be a metal, such as an alkali metal, for instance, sodium, potassium or lithium; an alkaline earth metal, for instance, barium, calcium, or a nontoxic polyvalent metal, such as magnesium, tin and zinc.

Usually, the triphosphites and acid phosphites will not have more than about sixty carbon atoms.

Exemplary triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, trioctadecyl phosphite, triisooctyl phosphite, tridodecyl phosphite, isooctyl diphenyl phosphite, diisooctyl phenyl phosphite, tri(t-octylphenyl)phosphite, tri-(t-nonylphenyl)phosphite, benzyl methyl isopropyl phosphite, butyl dicresyl phosphite, isooctyl di(octylphenyl)phosphite, di(2-ethylhexyl) (isooctylphenyl)phosphite, tri(2-cyclohexylphenyl)phosphite), tri-α-naphthyl phosphite, tri(-phenylphenyl)phosphite, tri(2-phenylethyl)phosphite, ethylene phenyl phosphite, ethylene t-butyl phosphite, ethylene isohexyl phosphite, ethylene isooctyl phosphite, ethylene cyclohexyl phosphite, b 2-phenoxy-1,3,2-dioxaphosphorinane, 2-butoxy-1,3,2-dioxyphosphorinane, 2-octoxy-5,5-dimethyl-dioxaphosphorinane, and 2-cyclohexyloxy-5,5-diethyl dioxaphosphorinane.

Exemplary pentaerythritol triphosphites are 3,9-diphenoxy-2,4,8,10-tetraoxa-3,9-diphosphaspiro-(5,5)-undecane (diphenyl-pentaerythritol diphosphite), 3,9-di(decyloxy)-2,4,8,10-tetraoxa-3,9-diphosphaspiro(5,5)-undecane, 3,9-di(isodecyloxy)-2,4,8,10-tetraoxa-3,9-diphosphaspiro-(5,5)-undecane, 3,9-di(octadecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(-lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane; 3,9-di(methoxyethyloxy)-2,4,8,10-tetraoxa-3,9-diphosphaspiro-(5,5)-undecane, 3-methoxyethyloxy-9-isodecyloxy-2,4,8,10-tetraoxa-3,9-diphosphaspiro-(5,5)-undecane, 3,9-di(ethoxyethyloxy)-2,4,8,10-tetraoxa-3,9-diphosphaspiro-(5,5)-undecane, 3,9-di(butoxyethyloxy)-2,4,8,10-tetraoxa-3,9-diphosphaspiro-(5,5)-undecane, 3-methoxyethyloxy-9-butoxy-ethyloxy-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di(butoxyethoxyethyloxy)-2,4,8,10-tetraoxa-3,9-diphosphaspiro-(5,5)-undecane, 3,9-di(methoxyethoxyethyloxy)-2,4,8,10-tetraoxa-3,9-diphosphaspiro-(5,5)-undecane, 3,9-di(methoxy(polyethoxy)ethyloxy)-2,4,8,10-tetraoxa-3,9-diphosphaspiro(5,5)-undecane, where the (polyethoxy) ethyloxy group has an average molecular weight of 350), 3,9-di(methoxy(polyethoxy)ethyloxy)-2,4,8,10-tetraoxa-3,9-diphosphaspiro-(5,5)-undecane (where the (polyethoxy) ethyloxy group has an average molecular weight of 550).

Exemplary of the bis aryl triphosphites are: bis(4,4'-thio-bis(2-tertiary-butyl-5-methyl-phenol))isooctyl phosphite, mono(4,4'-thio-bis(2-tertiary-butyl-5-methyl-phenol))di-phenylphosphite, tri-(4,4'-n-butylidene-bis(2-tertiary-butyl-5-methylphenol))phosphite, (4,4'-benzylidene-bis(2-tertiary-butyl-5-methyl-phenol))diphenyl phosphite, isooctyl 2,2'-bis(-parahydroxyphenyl)propane phosphite, decyl 4,4'-n-butylidene-bis(2-tertiary-butyl-5-methylphenol)phosphite, tri-4,4'-thio-bis (2-tertiary-butyl-5-methylphenol)phosphite, 2-ethylhexyl-2,2'-methylene-bis(4-methyl-6,1'-methyl-cyclohexyl)phenol phosphite, tri(2,2'-bis-(para-hydroxyphenyl)propane)phosphite, tri(4,4'-thio-bis(2-tertiary-butyl-5-methyl-phenol)phosphite, isooctyl-(2,6-bis(2'-hydroxy-3,5-dinonylbenzyl)-4-nonyl phenyl))phosphite, tetra-tridecyl-4,4'-n-butylidene-bis(2-tertiary-butyl-5-methylphenyl)diphosphite, tetra-isooctyl-4,4'-thio-bis(2-tertiary-butyl-5-methylphenyl)diphosphite, 2,2'-methylene-bis(4-methyl-6,1'-methyl cyclohexyl phenyl)polyphosphite, isooctyl-4,4'-isopropylidene-bis-phenyl polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiarybutyl-5-methylphenyl)diphosphite, tetra-tridecyl-4,4'-isopropylidene bisphenyl diphosphite, hexa-tridecyl butane-1,1,3-tris(2'-methyl-5'-tertiary-butylphenyl-4')triphosphite.

Exemplary acid phosphites are di(phenyl)phosphite, monophenyl phosphite, mono(diphenyl)phosphite, dicresyl phosphite, di-(o-isooctylphenyl)phosphite, di(p-ethylhexylphenyl)phosphite, di(p-t-octylphenyl)phosphite, di(dimethylphenyl)phosphite, di-n-butyl phosphite, di-2-ethylhexyl phosphite, mono-2-ethylhexylphosphite, disooctyl phosphite, monoisooctyl phosphite, monododecyl phosphite, 2-ethylhexyl phenyl phosphite, 2-ethylhexyl-(n-octylphenyl)phosphite, monocyclohexyl phosphite, dicylohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary of the bis aryl acid phosphites are: bis(4,4'-thio-bis(2-tertiary-butyl-5-methylphenol))-phosphite, (4,4'-thio-bis(2-tertiary-butyl-5-methylphenol))phenyl phosphite, bis(4,4'-n-butylidene-bis(2-tertiary-butyl-5-methylphenol))phosphite, mono(4,4'-benzylidene-bis(2-tertiary-butyl-5-methylphenol))phosphite, mono(2,2'-bis-(parahydroxyphenyl)propane)phosphite, mono(4,4'-butylidene-bis(2-tertiary-butyl-5-methylphenol)phosphite, bis(4,4'-thio-bis(2-tertiary-butyl-5-methylphenol))phosphite, mono-2-ethylhexyl-mono-2,2'-methylene-bis(4-methyl-6,1'-methylcyclohexyl)-phenol phosphite, bis(2,2'-bis(para-hydroxyphenyl)propane)phosphite, monoisooctyl-mono(4,4'-thio-bis(2-tertiary-butyl-5-methylphenol))phosphite, isooctyl-(2,6-bis(2'-hydroxy-3,5-dinonylbenzyl)-4-nonylphenyl))phosphite, tri-tridecyl-4,4'-n-butylidene-bis(2-tertiary-butyl-5-methylphenyl)diphosphite, triisooctyl-4,4'-thio-bis(2-tertiary-butyl-5-methylphenyl)diphosphite, bis(2,2'-methylene-bis(4-methyl-6,1'-methyl cyclohexyl phenyl))phosphite, isooctyl-4,4'-isopropylidene-bis-phenyl phosphite, monophenyl mono(2,2'-methylene-bis(4-methyl-6,1'-methyl-cyclohexyl))triphosphite, di-tridecyl-4,4'-oxydiphenyl diphosphite, di-n-dodecyl-4,4'-n-butylidene-bis(2-tertiary-butyl-5-methylphenyl)diphosphite, di-tridecyl-4,4'-isopropylidene bisphenyl diphosphite, tetra-tridecyl butane-1,1,3-tris(2'-methyl-5-tertiary-butylphenyl-4)-triphosphite.

The thiodipropionic acid ester has the following formula:

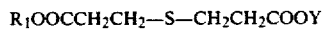

$$R_1OOCCH_2CH_2-S-CH_2CH_2COOY$$

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

$$-XO[OCCH_2CH_2SCH_2CH_2COOXO]_nOCCH_2CH_2-S-CH_2CH_2COOZ$$

where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylenearylene and mixed alkylenecycloalkylene radicals; hydroxyalkylene and hydroxyalkyloxyalkylene radicals; and esters thereof with aliphatic carboxylic acids; the value of n can range upwards from 0, but there is no upper limit on n except as is governed by the ratio of carbon atoms to sulfur atoms as stated below; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty carbon atoms per sulfur atom.

Accordingly, the various thiodipropionic acid ester species coming within the above-designated categories within the general formula can be defined as follows:

(a) $R_1OOCCH_2CH_2SCH_2CH_2COOH$
(b) $R_1OOCCH_2CH_2SCH_2CH_2COOR_2$
(c) $R_1O[OCCH_2CH_2SCH_2CH_2COOX-O]_n OCCH_2CH_2SCH_2CH_2COOZ$
(d) $R_1OOCCH_2CH_2SCH_2CH_2COOM$

In the above formulae $R_1$ and $R_2$, M, X and Z are the same as before and the value of $n_1$ can range upwards from 1, but there is no upper limit on $n_1$ except as is imposed by the ratio of carbon atoms, as stated below. In the polymer (c), as in the other forms of thiodipropionic acid esters, the total number of carbon atoms per sulfur atom is within the range from about ten to about sixty.

The R radical of these esters is important in furnishing compatibility with the polymer. The Y radical is desirably a different radical, $R_2$ or M or a polymer, where R is rather low in molecular weight, so as to compensate for this in obtaining the optimum compatibility and nonvolatility. Where Y is a metal, the thiodipropionic acid ester furnishes the beneficial properties of the polyvalent metal salt which is described above.

The aryl, alkyl, alkenyl, and cycloalkyl groups may, if desired, contain inert, nonreactive substituents such as halogen and other carbocyclic and heterocyclic ring structures condensed therewith.

Typical R radicals are, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, cyclohexyl, benzyl, cyclopentyl, methylcyclohexyl, ethylcyclohexyl, and naphthenyl, hydroxyethyl, hydoxypropyl, glyceryl, sorbityl, pentaerythrityl, and polyoxyalkylene radicals such as those derived from diethylene glycol, triethylene glycol, polyoxypropylene glycol, polyoxyethylene glycol, and polyoxypropyleneoxyethylene glycol, and esters thereof with any of the organic acids named below in the discussion of the polyvalent metal salts, including in addition those organic acids having from two to five carbon atoms, such as acetic, propionic, butyric and valeric acids.

Typical X radicals are alkylene radicals such as ethylene, tetramethylene, hexamethylene, decamethylene, alkyl-substituted alkylene radicals such as 1,2-propylene, $$-CH_2-\underset{\underset{CH_3}{|}}{\overset{\overset{CH_3}{|}}{C}}- \text{ and } -CH_2-\underset{\underset{CH_3}{|}}{\overset{\overset{CH_3}{|}}{C}}-CH_2-$$

arylene radicals such as phenylene 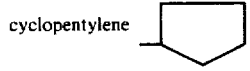

-continued

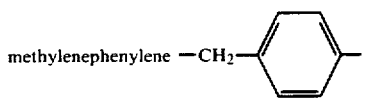
methylenephenylene

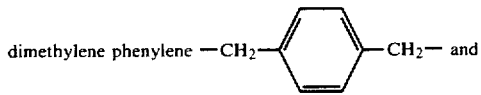
dimethylene phenylene

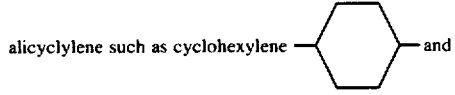
alicyclylene such as cyclohexylene

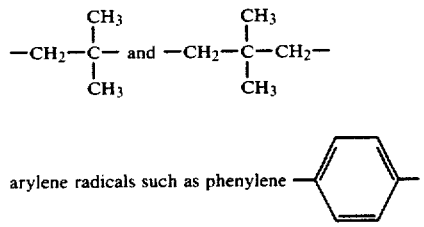
cyclopentylene

As exemplary of the thiodipropionic acid esters which can be used, there can be mentioned the following: monolauryl thiodipropionic acid, dilauryl thiodipropionate, butyl stearyl thiodipropionate, 2-ethylhexyl lauryl thiodipropionate, di-2-ethylhexyl-thiodipropionate, diisodecyl thiodipropionate, isodecyl phenyl thiodipropionate, benzyl lauryl thiodipropionate, benzyl phenyl thiodipropionate, the diester of mixed coconut fatty alcohols and thiodipropionic acid, the diester of mixed tallow fatty alcohols and thiodipropionic acid, the acid ester of mixed cottonseed oil fatty alcohols and thiodipropionic acid, the acid ester of mixed soyabean oil fatty alcohols and thiodipropionic acid, cyclohexyl nonyl thiodipropionate, monooleyl thiodipropionic acid, hydroxyethyl lauryl thiodipropionate, monoglycerol thiodipropionic acid, glyceryl monostearate monothiodipropionate, sorbityl isodecyl thiodipropionate, the polyester of diethylene glycol and thiodipropionic acid, the polyester of triethylene glycol and thiodipropionic acid, the polyester of hexamethylene glycol and thiodipropionic acid, the polyester of pentaerythritol and thiodipropionic acid, the polyester of octamethylene glycol and thiodipropionic acid, the polyester of p-dibenzyl alcohol and thiodipropionic acid, ethylbenzyl lauryl thiodipropionate, strontium stearyl thiodipropionate, magnesium oleyl thiodipropionate, calcium dodecylbenzyl thiodipropionate, and mono(dodecylbenzyl)thiodipropionic acid.

These esters are for the most part known compounds, but where they are not available, they are readily prepared by esterification of thiodipropionic acid and the corresponding alcohol.

Also useful are:

(1) Thioalkanoic acid amides of Tokuno et al Japanese Pat. No. 16,286/68 having the formula:

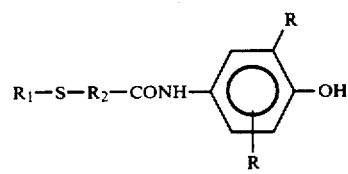

R is alkyl of one to eight carbon atoms, $R_1$ is alkyl of six to twenty-four carbon atoms, and $R_2$ is alkylene of one to six carbon atoms.

(2) Thioalkanoic acid amides of 1,3,5-triazines of Ozeki et al Japanese Pat. No. 20,366/68 having the formula:

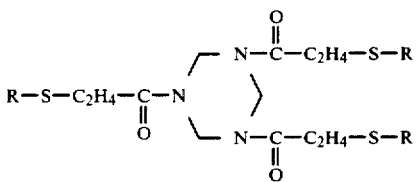

R is alkyl of eight to eighteen carbon atoms.

(3) Bis-thioalkanoic acid amides of Yamamoto et al Japanese Pat. No. 23,765/68 having the formula:

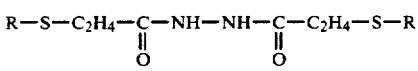

R is alkyl of more than six carbon atoms, aryl or aralkyl.

(4) Bis-thioalkylanoic acid amides of Ozeki et al Japanese Pat. No. 26,184/69 having the formula:

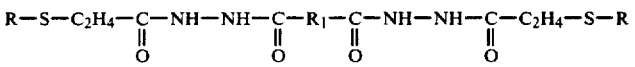

R is alkyl of twelve to eighteen carbon atoms, and $R_1$ is alkylene of one to ten carbon atoms, cycloalkylene, or arylene.

(5) Bis-alkylene thioalkanoic acid amides of Ozeki Japanese Pat. No. 31,464/69 having the formula:

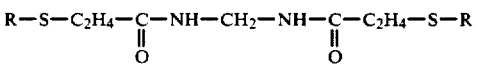

R is alkyl of more than six carbon atoms, aryl, or aralkyl.

(6) Thioalkanoic acid amide derivatives of Minagawa et al, published Japanese application No. 106,484/74 having the formula:

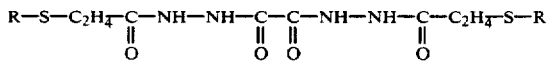

R is hydrocarbyl of one to twenty carbon atoms.

(7) Alkylene bis-thioalkanoic acid amides of U.S. Pat. No. 4,279,805 to Ohzeki et al, patented July 21, 1981, having the general formula:

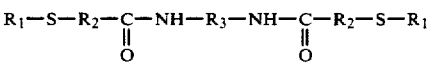

wherein:
$R_1$ is alkyl having from one to about fifty carbon atoms;
$R_2$ is alkylene having from one to about three carbon atoms; and
$R_3$ is alkylene having from about two to about twelve carbon atoms.

β-Alkylthiopropionic acid esters having the general formula:

$$R-S-C_2H_4COOR-R')_n$$

wherein:
R is alkyl of four to twenty carbon atoms;
n is a number from 1 to 6; and
R' is the residue of an alcohol having from one to six hydroxyl groups.

Pentaerythritol tetra dodecyl thio propionate is an example of this group.

Other conventional light stabilizers can be employed, such as hydroxybenzophenones such as 2-hydroxy-4-methoxybenzophenone, 2-hydroxy-4-n-octoxy benzophenone, 2,4-dihydroxybenzophenone, benzotriazoles, such as 2(2-hydroxy-5-methylphenyl)benzotriazoles, 2(2-hydroxy-3,4-butyl-5-methylphenyl)-5-chlorobenzotriazole, 2(2-hydroxy-3-5-di-t-butylphenyl)5-chlorobenzotriazole, 2(2-hydroxy-3,5-di-t-amylphenyl)benzotriazole, benzoates such as phenylsalicylate, 2,4-di-t-butylphenyl-3,5-di-t-butyl-4-hydroxy phenylbenzoate, nickel compounds such as nickel-2,2'-thiobis(4-t-octylphenolate), nickel-monoethyl(3,5-di-t-butyl-4-hydroxybenzyl)phosphonate, substituted acrylonitriles such as methyl-α-cyano-β-methyl-β-(p-methoxy phenyl)acrylate and oxalic anilides such as N-2-ethyl phenyl-N'-2-ethoxy-5-t-butyl phenyl oxalic diamide, N-2-ethyl phenyl-N'-2-ethoxy phenyl oxalic diamide.

A sufficient amount of the stabilizer composition is used to improve the resistance of the synthetic polymer to deterioration in physical properties when exposed to heat and light, including, for example, discoloration, reduction in melt viscosity and embrittlement. Very small amounts are usually adequate. Amounts within the range from about 0.001 to about 10% total stabilizers including the light stabilizer system of the invention by weight of the polymer are satisfactory. Preferably, from 0.01 to 5% is employed for optimum stabilization.

Inasmuch as all components are solids, the stabilizer systems of the invention are readily rendered in solid particulate form, comprising a blend of:
(a) alkylidene-bis-benzotriazolyl phenol in an amount of from about 10 to about 35 parts by weight;
(b) 2,2,6,6-tetramethyl piperidyl compound in an amount of from about 10 to about 35 parts by weight;
and optionally:
(c) a phenolic antioxidant in an amount from about 10 to about 35 parts by weight; and/or
(d) other heat or light stabilizers in an amount of from about 10 to about 35 parts by weight.

The light stabilizer systems of the invention can be employed in combination with phenolic antioxidant and/or other conventional heat and light stabilizers for the particular synthetic polymer.

Thus, for example, in the case of polyvinyl chloride resins, other polyvinyl chloride resin heat stabilizers can be included, including polyvalent metal fatty acid salts such as barium and cadmium salts of the higher fatty acids; organotin compounds; and epoxy compounds.

With polyolefin resins there can be employed fatty acid salts of polyvalent metals, and the higher fatty acid esters of thiodipropionic acids, such as, for example, dilauryl thiodipropionate.

With polyamide resin compositions, polyamide stabilizers such as copper salts in combination with iodides and/or other phosphorus compounds and salts of divalent manganese can be used.

With synthetic rubbers and acrylonitrile-butadiene-styrene terpolymers, other antioxidants and polyvalent metal salts of the higher fatty acids can be used.

In addition, other conventional additives for synthetic polymers, such as plasticizers, lubricants, emulsifiers, antistatic agents, flame-proofing agents, pigments and fillers, can be employed.

The stabilizer composition is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polymer can be worked into the desired shape, such as by milling, calendering, extruding or injection molding or fiber-forming. In such operations, it will be found to have a considerably improved resistance to reduction in melt viscosity during the heating, as well as a better resistance to discoloration and embrittlement on ageing and heating.

The following Examples illustrate preferred stabilizer systems and polymer compositions of the invention.

EXAMPLES 1 TO 12

Polypropylene compositions were prepared using stabilizers of this invention and of the prior art, and having the following formulation.

| Ingredient | Parts by Weight |
|---|---|
| Unstabilized polypropylene | 100 |
| Calcium stearate | 0.2 |
| Pentaerythritol tetrakis(3,5-di-t-butyl-4-hydroxyphenylpropionate) | 0.1 |
| 2,2,6,6-tetramethyl piperidine compound as shown in Table I | 0.2 |
| 2,2'-methylenebis(4-1,1,3,3-tetramethyl-butyl)-6-benzotriazolphenol as shown in Table I | 0.1 |

The compositions were thoroughly blended in a Brabender Plastograph, and then compression-molded to form sheets 0.3 mm thick. Pieces 2.5 cm$^2$ were cut off from the sheets, and exposed to a high-pressure mercury lamp. The hours to failure were noted, and are shown in Table I.

TABLE I

| Example No. | Light Stabilizer | Hours to Failure |
|---|---|---|
| Control 1 | 2,2'-Methylenebis(4-(1,1,3,3-tetramethylbutyl)-6-benzotriazolylphenol)) 0.2 part | 390 |
| Control 2 | 2,2'-Methylenebis(4-methyl-6-benzotriazolylphenol) 0.2 part | 320 |
| Control 3 | 2,2'-Methylenebis(4-methyl-6-benzotriazolylphenol) 0.1 part and 4-(1,1,3,3-tetramethylbutyl)-6-benzotriazolylphenol 0.1 part | 430 |
| | 2,2'-Methylenebis(4-(1,1,3,3-tetramethylbutyl)-6-benzotriazolylphenol)) 0.2 part with 0.1 part of: | |
| 1 | 4-Benzoyloxy-2,2,6,6-tetramethyl-piperidine | 570 |

TABLE I-continued

| Example No. | Light Stabilizer | Hours to Failure |
|---|---|---|
| 2 | Bis(2,2,6,6-tetramethyl-4-piperidyl) sebacate | 660 |
| 3 | Bis(1,2,2,6,6-pentamethyl-4-piperidyl) sebacate | 680 |
| 4 | Tetra(2,2,6,6-tetramethyl-4-piperidyl)-1,2,3,4-butanetetracarboxylate | 770 |
| 5 | Bis(1,2,2,6,6-pentamethyl-4-piperidyl)-di(isotridecyl)-1,2,3,4-butanetetracarboxylate | 740 |
| 6 | 3,9-Bis(1,1-dimethyl-2-(tris(1,2,2,6,6-pentamethyl-4-piperidyl-oxy-carbonyl)butylcarbonyloxy) ethyl)-2,4,8,10-tetraoxaspiro[5.5]undecane | 800 |
| 7 | 2-Dibutylamino-4,6-bis(9-aza-8,8,10,10-tetramethyl-3-ethyl-1,5-dioxaspiro[5.5]-3-undecylmethoxy)-s-triazine | 680 |
| 8 | Bis(9-aza-8,8,10,10-tetramethyl-3-ethyl-1,5-dioxaspiro[5.5]-3-undecyl-methyl)-hydrogenatedbisphenol-A-dicarbonate | 720 |
| 9 | Condensate of 1-(2-hydroxyethyl)-2,2,6,6-tetramethyl-4-piperidinol with dimethylsuccinate | 720 |
| 10 | Condensate of 2-t-octylamino-4,6-dichloro-s-triazine with N,N'—bis-(2,2,6,6-tetramethyl-4-piperidyl) hexamethylene-diamine | 740 |
| 11 | Condensate of N,N'—bis(2,2,6,6-tetramethyl-4-piperidyl) with hexamethylenediamine/dibromo-ethane | 660 |
| 12 | Bis(9-aza-8,8,10,10-tetramethyl-3-ethyl-1,5-dioxaspiro[5.5]-3-undecylmethyl)ether | 680 |

The data show the combinations of the invention to be superior to the piperidyl compound or benzotriazolyl phenol, taken alone, and to the combination of piperidyl compound and benzotriazolyl phenol of the prior art (Control 3), corresponding to the benzotriazolyl phenol of the invention without the alkylidene-bis structure.

EXAMPLES 13 TO 17

High density polyethylene compositions were prepared using stabilizers of the invention and of the prior art, and having the following formulation:

| Ingredient | Parts by Weight |
|---|---|
| High density polyethylene | 100 |
| Calcium stearate | 1.0 |
| Tetrakis(methylene-3-(3,5-di-t-butyl-4-hydroxyphenyl)propionate)methane | 0.1 |
| Distearyl thiodipropionate | 0.3 |
| Tetrakis(2,2,6,6-tetramethyl-4-piperidyl) 1,2,3,4-butanetetracarboxylate as shown in Table II | 0.05 |
| Alkylidenebis(benzotriazolylphenol)as shown in Table II | 0.2 |

The stabilizers were blended with the polymer on a two-roll mill, and sheets 0.5 mm thick were prepared by compression-molding of the blend. Pieces 2.5 cm square were cut off from the sheets, and exposed in a Weather-O-Meter to ultraviolet light. The time in hours when degradation set in, as determined by a significant discoloration and/or embrittlement, was noted as hours to failure, and the results are reported in Table II.

TABLE II

| Example No. | Light Stabilizer | Hours to Failure |
|---|---|---|
| Control 1 | Tetra(2,2,6,6-tetramethyl-4-piperidyl)-1,2,3,4-butanetetracarboxylate 0.15 part | 920 |
| Control 2 | 2,2'-Methylenebis(4-methyl-6-benzotriazolylphenol) 0.15 part with tetra(2,2,6,6-tetramethyl-4-piperidyl)-1,2,3,4-butanetetracarboxylate 0.05 part | 900 |
| Control 3 | 2-(2'-Hydroxy-5'-methylphenyl)benzotriazole 0.15 part | 790 |
| Control 4 | 2-(2'-Hydroxy-5'-methylphenyl)benzotriazole 0.15 part Tetra(2,2,6,6-tetramethyl-4-piperidyl)-1,2,3,4-butanetetracarboxylate 0.05 part with 0.15 part of: | 580 |
| 13 | 2,2'-Methylenebis(4-methyl-6-benzotriazolylphenol) | 1,430 |
| 14 | 2,2'-Methylenebis(4-(1,1,3,3-tetramethylbutyl)-6-benzotriazolylphenol)) | 1,480 |
| 15 | 2,2'-Methylenebis(4-cumyl-6-benzotriazolylphenol) | 1,450 |
| 16 | 2,2'-Octylidenebis(4-methyl-(5'methylbenzotriazolyl)phenol) | 1,260 |
| 17 | 2,2'-Octylidenebis(4-methyl-(5'-chlorobenzotriazolyl)phenol) | 1,280 |

The data show the combinations of the invention to be superior to the piperidyl compound or benzotriazolyl phenol, taken alone, and to the combination of piperidyl compound and benzotriazolyl phenol of the prior art (Control 3), corresponding to the benzotriazolyl phenol of the invention without the alkylidene-bis structure.

EXAMPLES 18 TO 25

A group of polyvinyl chloride resin compositions including stabilizers of the invention was prepared having the following formulation:

| Ingredient | Parts by Weight |
|---|---|
| Polyvinyl chloride resin homopolymer | 100 |
| Dioctyl phthalate | 48 |
| Epoxidized soybean oil | 2 |
| Tris(nonylphenyl)phosphite | 0.2 |
| Calcium stearate | 1.0 |
| Zinc stearate | 0.1 |
| 2,2'-Methylenebis(4-(1,1,3,3-tetramethylbutyl)-6-benzotriazolylphenol)) as shown in Table III | 0.1 |
| 2,2,6,6-tetramethyl piperidyl compound as shown in Table III | 0.1 |

The formulations were blended and sheeted off on a two-roll mill to form sheets 1 mm thick. The light resistance of these sheets was then determined by placing strips 1 cm wide in a Weather-O-Meter, and exposing them to ultraviolet light. The time in hours was noted for the sheets to develop a noticeable discoloration and/or embrittlement, indicating deterioration due to oxidation in the presence of ultraviolet light. The results obtained are shown in Table III.

TABLE III

| Example No. | Light Stabilizer | Hours to Failure |
|---|---|---|
| Control 1 | None | 200 |
| Control 2 | 2,2'-Methylenebis(4-(1,1,3,3-tetramethylbutyl)-6-benzotriazolylphenol)) 0.2 part | 460 |
| Control 3 | Bis(2,2,6,6-tetramethyl-4-piperidyl) sebacate 0.2 part 2,2'-Methylenebis(4-(1,1,3,3-tetramethylbutyl)-6-benzotriazolylphenol)) 0.1 part with 0.1 part of: | 360 |
| 18 | Bis(2,2,6,6-tetramethyl-4-piperidyl) sebacate | 640 |
| 19 | Tetra(2,2,6,6-tetramethyl-4-piperidyl)-1,2,3,4-butanetetracarboxylate | 730 |
| 20 | Bis(1,2,2,6,6-pentamethyl-4-piperidyl)-di(isotridecyl)-1,2,3,4-butanetetracarboxylate | 680 |
| 21 | 3,9-Bis(1,1-dimethyl-2-(tris(2,2,6,6-tetramethyl-4-piperidyl-oxycarbonyl) butylcarbonyloxy)ethyl)-2,4,8,10-tetraoxaspiro[5.5]undecane | 680 |
| 22 | 1,5,8,12-Tetrakis(4,6-bis(N—(2,2,6,6-tetramethyl-4-piperidyl)butylamino)-1,3,5-triazine-2-yl)1,5,8,12-tetraazadodecane | 660 |
| 23 | Bis(2,2,6,6-tetramethyl-4-piperidyl)-pentaerythritol-diphosphite | 730 |
| 24 | Condensate of N,N'—bis(2,2,6,6-tetramethyl-4-piperidyl) with hexamethylenediamine/dibromoethane | 640 |
| 25 | 2,2,4,4-Tetramethyl-7-oxa-3,20-diazadispiro[5.1.11.2]heneicosane-21-one | 610 |

The data show the combinations of the invention to be superior to the piperidyl compound or benzotriazolyl phenol, taken alone.

EXAMPLES 26 TO 33

Acrylonitrile-butadiene-styrene terpolymer resin compositions were prepared using stabilizers of the invention and having the following formulation:

| Ingredient | Parts by Weight |
|---|---|
| Acrylonitrile-butadiene-styrene terpolymer | 100 |
| 4,4'-Butylidenebis(2-t-butyl-m-cresol) | 0.1 |
| 2,2'-Methylenebis(4-(1,1,3,3-tetramethylbutyl)-6-benzotriazolylphenol)) as shown in Table IV | 0.1 |
| 2,2,6,6-tetramethyl piperidyl compound as shown in Table IV | 0.15 |

The stabilizers were blended with the resin on a two-roll mill, and sheets 3 mm thick were prepared by compression-molding of the resulting blend. Pieces 2.5 cm square were cut off from the sheets, and subjected to ultraviolet light in a Weather-O-Meter for 800 hours. Tensile strength before and after the test exposure was determined, and the results reported as the percent of tensile strength retained, at the end of this time, in Table IV:

TABLE IV

| Example No. | Light Stabilizer | % Retention of Tensile Strength |
|---|---|---|
| Control 1 | 2,2'-Methylenebis(4-1,1 3,3-tetramethylbutyl)-6-benzotriazolylphenol)) 0.25 part | 62 |
| Control 2 | Bis(2,2,6,6-tetramethyl-4-piperidyl) sebacate 0.25 part | 63 |

TABLE IV-continued

| Example No. | Light Stabilizer | % Retention of Tensile Strength |
|---|---|---|
|  | 2,2'-Methylenebis(4-(1,1,3,3-tetramethylbutyl)-6-benzotriazolylphenol)) 0.15 part with 0.1 part of: |  |
| 26 | Bis(2,2,6,6-tetramethyl-4-piperidyl) sebacate | 83 |
| 27 | Bis(1,2,2,6,6-pentamethyl-4-piperidyl)-2-butyl-2-(3,5-di-t-butyl-4-hydroxybenzyl)malonate | 79 |
| 28 | Tetra(2,2,6,6-tetramethyl-4-piperidyl)-1,2,3,4-butanetetracarboxylate | 85 |
| 29 | Bis(2,2,6,6-tetramethyl-4-piperidyl)-di(isotridecyl)-1,2,3,4-butanetetracarboxylate | 84 |
| 30 | 3,9-Bis(1,1-dimethyl-2-(tris(1,2,2,6,6-pentamethyl-4-piperidyl-oxycarbonyl)butylcarbonyloxy)ethyl)-2,4,8,10-tetraoxaspiro[5.5]undecane | 85 |
| 31 | Bis(9-aza-8,8,10,10-tetramethyl-3-ethyl-1,5-dioxaspiro[5.5]-3-undecylmethyl)-hydrogenated bisphenol-A-dicarbonate | 82 |
| 32 | Condensate of 1-(2-hydroxyethyl)-2,2,6,6-tetramethyl-4-piperidinol with dimethylsuccinate | 78 |
| 33 | Bis(9-aza-8,8,10,10-tetramethyl-3-ethyl-1,5-dioxaspiro[5.5]-3-undecylmethyl)ether | 82 |

The data show the combinations of the invention to be superior to the piperidyl compound or benzotriazolyl phenol, taken alone.

EXAMPLES 34 TO 41

Polyurethane resin compositions were prepared, using stabilizers of the invention, and having the following formulation:

| Ingredient | Parts by Weight |
|---|---|
| Polyurethane resin (Asahi Denka U-100) | 100 |
| Ba stearate | 0.7 |
| Zn stearate | 0.3 |
| 2,6-Di-t-butyl-p-cresol | 0.1 |
| 2,2'-Methylenebis(4-(1,1,3,3-tetramethylbutyl)-6-benzotriazolylphenol)) as shown in Table V | 0.3 |
| 2,2,6,6-tetramethyl piperidyl compound as shown in Table V | 0.2 |

The stabilizers were blended with the resin on a two-roll mill for five minutes at 70° C., and the sheets then compression-molded at 120° C. for five minutes to form sheets 0.5 mm thick. Pieces 2.5 cm square were cut off from the sheets, and exposed to ultraviolet light in a Weather-O-Meter for fifty hours. Elongation before and after exposure was determined, and the percent elongation retained after exposure is given in Table V.

TABLE V

| Example No. | Light Stabilizer | % Retention of Elongation |
|---|---|---|
| Control 1 | 2,2'-Methylenebis(4-(1,1,3,3-tetramethylbutyl)-6-benzotriazolylphenol)) 0.5 part | 66 |
| Control 2 | Bis(1,2,2,6,6-pentamethyl-4-piperidyl)sebacate 2,2'-Methylenebis(4-(1,1,3,3-tetramethylbutyl)-6-benzotriazolylphenol)) 0.3 part with 0.2 part of: | 72 |
| 34 | Bis(1,2,2,6,6-pentamethyl-4-piperidyl)sebacate | 86 |
| 35 | Tetra(2,2,6,6-tetramethyl-4-piperidyl)-1,2,3,4-butanetetracarboxylate | 88 |
| 36 | Bis(1,2,2,6,6-pentamethyl-4-piperidyl)-di(isotridecyl)-1,2,3,4-butanetetracarboxylate | 85 |
| 37 | Bis(2,2,6,6-tetramethyl-4-piperidyl-1-oxy)-di(isotridecyl)-1,2,3,4-butanetetracarboxylate | 84 |
| 38 | 3,9-Bis(1,1-dimethyl-2-(tris(1,2,2,6,6-pentamethyl-4-piperidyl-oxycarbonyl)butylcarbonyloxy)ethyl)-2,4,8,10-tetraoxaspiro[5.5]undecane | 87 |
| 39 | Bis(9-aza-8,8,10,10-tetramethyl-3-ethyl-1,5-dioxaspiro[5.5]-3-undecylmethyl)-hydrogenated bisphenol-A-dicarbonate | 86 |
| 40 | Condensate of 2-t-octylamino-4,6-dichloro-s-triazine with N,N'—bis-(2,2,6,6-tetramethyl-4-piperidyl)hexamethylene-diamine | 83 |
| 41 | 2,2,4,4-Tetramethyl-7-oxa-3,20-diazadispiro[5.1.11.2]heneicosane-21-one | 82 |

The data show the combinations of the invention to be superior to the piperidyl compound or benzotriazolyl phenol, taken alone.

EXAMPLES 42 TO 49

The stabilizers of this invention are effective light stabilizers for lacquer coatings:

The effect of the stabilizers in a two-coat metallic effect finish comprising metallic effect priming lacquer and unpigmented finishing lacquer was determined.

(a) Metallic effect priming lacquer

Methyl methacrylate 100 g, n-butyl acrylate 66 g, 2-hydroxyethyl methacrylate 30 g, methacrylic acid 4 g, xylene 80 g and n-butanol 20 g were heated and stirred at 110° C. while a solution of azobis(isobutyronitrile) 2 g, dodecylmercaptan 0.5 g, xylene 80 g and n-butanol 20 g was added dropwise over three hours. After addition was completed, the solution was stirred for two more hours at 110° C., thus preparing an acrylic resin solution.

This acrylic resin solution 12 parts, was blended with butoxylated methylol melamine (Mitsui Toatsu Co., Yuban 20SE60: solids content 60%) 2.5 parts, cellulose acetobutyrate (20% butylacetate solution) 50 parts, aluminum pigment (Toyo Aluminum Co., Alpaste 1123N) 5.5 parts, xylene 10 parts, butyl acetate 20 parts and copper phthalocyanine blue 0.2 parts to form a priming lacquer.

(b) Unpigmented finishing lacquer

The above acrylic resin solution 48 parts, were blended with butoxylated methylol melamine 10 parts, xylene 10 parts, butoxyethyl acetate 4 parts, 2,2'-methylenebis(4-(1,1,3,3-tetramethylbutyl)-6-benzotriazolylphenol)) 0.1 parts as shown in Table VI, and 2,2,6,6-tetramethyl piperidyl compound 0.05 part as shown in Table VI.

Pieces of steel sheeting precoated with a primer were first coated with the priming lacquer, and subsequently with the finishing lacquer. The priming lacquer was sprayed on to a thickness of about 20μ, and aired for 10 minutes. Then the clear lacquer was sprayed on to a thickness of about 30μ. After being aired 15 minutes the samples were heated in an oven for 30 minutes at 140° C.

The coated sheets were exposed to ultraviolet light in a Weather-O-Meter. The time in hours when degradation set in, as determined by cracking on the surface of the sheet, was noted as hours to failure, and the results are shown in Table VI.

TABLE VI

| Example No. | Light Stabilizer | Hours to Failure |
|---|---|---|
| Control 1 | None | 1,600 |
| Control 2 | 2,2'-Methylenebis(4-(1,1,3,3-tetramethylbutyl)-6-benzotriazolylphenol)) 0.15 part | 2,800 |
| Control 3 | Bis(1,2,2,6,6-pentamethyl-4-piperidyl)sebacate 0.15 part | 2,300 |
| | 2,2'-Methylenebis(4-(1,1,3,3-tetramethylbutyl)-6-benzotriazolylphenol)) 0.1 part with 0.05 part of: | |
| 42 | 4-Benzoyloxy-2,2,6,6-tetramethylpiperidine | 3,200 |
| 43 | Bis(1,2,2,6,6-pentamethyl-4-piperidyl)sebacate | 3,500 |
| 44 | Bis(1-acryloyl-2,2,6,6-pentamethyl-4-piperidyl)-2-butyl-2-(3,5-di-t-butyl-4-hydroxybenzyl)malonate | 3,400 |
| 45 | Bis(1,2,2,6,6-pentamethyl-4-piperidyl)-di(isotridecyl)-1,2,3,4-butanetetracarboxylate | 3,900 |
| 46 | 3,9-Bis(1,1-dimethyl-2-(tris(1,2,2,6,6-pentamethyl-4-piperidyloxycarbonyl)butylcarbonyloxy)ethyl)-2,4,8,10-tetraoxaspiro[5.5]undecane | 3,900 |
| 47 | 2-Dibutylamino-4,6-bis(9-aza-8,8,10,10-tetramethyl-3-ethyl-1,5-dioxaspiro[5.5]-3-undecylmethoxy)-s-triazine | 3,800 |
| 48 | Condensate of 1-(2-hydroxyethyl)-2,2,6,6-tetramethyl-4-piperidinol with dimethylsuccinate | 3,300 |
| 49 | 3-Dodecyl-8-acetyl-7,7,9,9-tetramethyl-1,3,8-triazaspiro[4.5]decane-2,4-dione | 3,500 |

The data show the combinations of the invention to be superior to the piperidyl compound or benzotriazolyl phenol, taken alone.

Having regard to the foregoing disclosure the following is claimed as the inventive and patentable embodiments thereof:

1. A stabilizer composition for improving the resistance of synthetic resins to deterioration when exposed to ultraviolet light, comprising
    (1) a 2,2,6,6-tetramethyl-piperidyl compound containing in the molecule at least one 2,2,6,6-tetramethyl-piperidyl group; and
    (2) an alkylidene-bis-(benzotriazolyl phenol) having the formula:

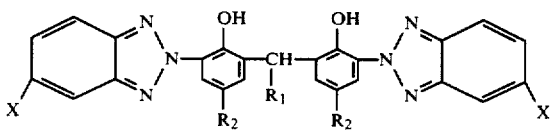

wherein:

$R_1$ is hydrogen or alkyl having from one to about twelve carbon atoms;

$R_2$ is alkyl having from one to about twelve carbon atoms or arylalkyl having from seven to about sixteen carbon atoms;

X is selected from the group consisting of hydrogen, halogen, alkyl having from one to about twelve carbon atoms, aryl having from six to ten carbon atoms, arylalkyl having from seven to about sixteen carbon atoms, alkoxy having from one to about twelve carbon atoms, aryloxy having from six to ten carbon atoms; and arylalkoxy having from seven to about sixteen carbon atoms.

2. A stabilizer composition according to claim 1 in which $R_1$ is hydrogen and $R_2$ is alkyl.

3. A stabilizer composition according to claim 1 in which $R_1$ and $R_2$ are each alkyl.

4. A stabilizer composition according to claim 1 in which $R_1$ is hydrogen and $R_2$ is arylalkyl.

5. A stabilizer composition according to claim 1 in which X is hydrogen.

6. A stabilizer composition according to claim 1 in which X is halogen.

7. A stabilizer composition according to claim 1 in which X is alkyl.

8. A stabilizer composition according to claim 1 in which X is aryl.

9. A stabilizer composition according to claim 1 in which X is arylalkyl.

10. A stabilizer composition according to claim 1 in which X is alkoxy.

11. A stabilizer composition according to claim 1 in which X is aryloxy.

12. A stabilizer composition according to claim 1 in which X is arylalkoxy.

13. A stabilizer composition according to claim 1 in which the alkylidene bis-benzotriazolyl phenol is 2,2'-methylenebis(4-methyl-6-benzotriazolylphenol).

14. A stabilizer composition according to claim 1 in which the alkylidene bis-benzotriazolyl phenol is 2,2'-methylenebis(4-(1,1,3,3-tetramethylbutyl)-6-benzotriazolylphenol)).

15. A stabilizer composition according to claim 1 in which the alkylidene bis-benzotriazolyl phenol is 2,2'-methylenebis(4-cumyl-6-benzotriazolylphenol).

16. A stabilizer composition according to claim 1 in which the alkylidene bis-benzotriazolyl phenol is 2,2'-octylidenebis(4-methyl-(5'-methylbenzotriazolyl)-phenol).

17. A stabilizer composition according to claim 1 in which the alkylidene bis-benzotriazolyl phenol is 2,2'-octylidenebis(4-methyl-(5'-chlorobenzotriazolyl)-phenol.

18. A stabilizer composition according to claim 9 in which the 2,2,6,6-tetramethyl-piperidyl compound is 4-benzoyloxy-2,2,6,6-tetramethyl-piperidine.

19. A stabilizer composition according to claim 9 in which the 2,2,6,6-tetramethyl-piperidyl compound is bis(2,2,6,6-tetramethyl-4-piperidyl)sebacate.

20. A stabilizer composition according to claim 9 in which the 2,2,6,6-tetramethyl-piperidyl compound is bis(1,2,2,6,6-pentamethyl-4-piperidyl)sebacate.

21. A stabilizer composition according to claim 9 in which the 2,2,6,6-tetramethyl-piperidyl compound is tetra(2,2,6,6-tetramethyl-4-piperidyl)-1,2,3,4-butanetetracarboxylate.

22. A stabilizer composition according to claim 9 in which the 2,2,6,6-tetramethyl-piperidyl compound is bis(1,2,2,6,6-pentamethyl-4-piperidyl)-di(isotridecyl)-1,2,3,4-butanetetracarboxylate.

23. A stabilizer composition according to claim 9 in which the 2,2,6,6-tetramethyl-piperidyl compound is 3,9-bis(1,1-dimethyl-2-(tris(1,2,2,6,6-pentamethyl-4-piperidyl-oxycarbonyl)butylcarbonyloxy)ethyl)-2,4,8,10-tetraoxaspiro[5.5]undecane.

24. A stabilizer composition according to claim 9 in which the 2,2,6,6-tetramethyl-piperidyl compound is 2-dibutylamino-4,6-bis(9-aza-8,8,10,10-tetramethyl-3-ethyl-1,5-dioxaspiro[5.5]-3-undecylmethoxy)-s-triazine.

25. A stabilizer composition according to claim 9 in which the 2,2,6,6-tetramethyl-piperidyl compound is bis(9-aza-8,8,10,10-tetramethyl-3-ethyl-1,5-dioxaspiro[5.5]-3-undecylmethyl)-hydrogenatedbisphenol-A-dicarbonate.

26. A stabilizer composition according to claim 9 in which the 2,2,6,6-tetramethyl-piperidyl compound is condensate of 1-(2-hydroxyethyl)-2,2,6,6-tetramethyl-4-piperidinol with dimethylsuccinate.

27. A stabilizer composition according to claim 9 in which the 2,2,6,6-tetramethyl-piperidyl compound is condensate of 2-t-octylamino-4,6-dichloro-s-triazine with N,N'-bis-(2,2,6,6-tetramethyl-4-piperidyl)hexamethylene-diamine.

28. A stabilizer composition according to claim 9 in which the 2,2,6,6-tetramethyl-piperidyl compound is condensate of N,N'-bis(2,2,6,6-tetramethyl-4-piperidyl) with hexamethylenediamine/dibromoethane.

29. A stabilizer composition according to claim 9 in which the 2,2,6,6-tetramethyl-piperidyl compound is bis(9-aza-8,8,10,10-tetramethyl-3-ethyl-1,5-dioxaspiro[5.5]-3-undecylmethyl)ether.

30. A polyvinyl chloride resin composition having improved resistance to deterioration upon exposure to ultraviolet light comprising a polyvinyl chloride resin and a stabilizer composition according to claim 1.

31. A polyvinyl chloride resin composition according to claim 30 in which the polyvinyl chloride resin is polyvinyl chloride homopolymer.

32. An α-olefin polymer resin composition having improved resistance to deterioration upon exposure to ultraviolet light comprising an α-olefin polymer and a stabilizer composition according to claim 1.

33. An α-olefin polymer composition according to claim 32 in which the α-olefin polymer is polypropylene.

34. An α-olefin polymer composition according to claim 32 in which the α-olefin polymer is polyethylene.

35. An acrylonitrile-butadiene-styrene terpolymer resin composition having improved resistance to deterioration upon exposure to ultraviolet light comprising an acrylonitrile-butadiene-styrene terpolymer resin and a stabilizer composition according to claim 1.

36. A polyurethane resin composition having improved resistance to deterioration upon exposure to ultraviolet light comprising a polyurethane resin and a stabilizer composition according to claim 1.

* * * * *